(12) United States Patent
Iyer et al.

(10) Patent No.: US 9,189,356 B2
(45) Date of Patent: Nov. 17, 2015

(54) DATA AUDIT MODULE FOR APPLICATION SOFTWARE

(75) Inventors: Harish Iyer, Anderi Mumbai (IN); Gururaj Anjan, Bhubaneswar (IN); Hemanata Kumar Dash, Bhubaneswar (IN); Abhishek Agrawal, Bhubaneswar (IN); Partheeban Kandasamy, Bhubaneswar (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 0 days.

(21) Appl. No.: 13/485,751

(22) Filed: May 31, 2012

(65) Prior Publication Data
US 2013/0031067 A1 Jan. 31, 2013

(30) Foreign Application Priority Data
Jul. 29, 2011 (IN) .......................... 2166/MUM/2011

(51) Int. Cl.
*G06F 11/30* (2006.01)
*G06F 21/64* (2013.01)

(52) U.S. Cl.
CPC .......... *G06F 11/302* (2013.01); *G06F 11/3072* (2013.01); *G06F 11/3093* (2013.01); *G06F 21/64* (2013.01)

(58) Field of Classification Search
CPC .............. G06F 11/302; G06F 11/3072; G06F 11/3093; G06F 21/64
See application file for complete search history.

(56) References Cited

U.S. PATENT DOCUMENTS

| | | | | |
|---|---|---|---|---|
| 8,332,349 | B1 * | 12/2012 | Wilson | 707/607 |
| 2005/0021567 | A1 * | 1/2005 | Holenstein et al. | 707/200 |
| 2005/0278270 | A1 | 12/2005 | Carr et al. | |
| 2006/0123010 | A1 * | 6/2006 | Landry et al. | 707/10 |
| 2006/0206860 | A1 * | 9/2006 | Dardinski et al. | 717/105 |
| 2007/0050366 | A1 * | 3/2007 | Bugir et al. | 707/9 |
| 2007/0100834 | A1 * | 5/2007 | Landry et al. | 707/10 |
| 2007/0198552 | A1 | 8/2007 | Farrand | |
| 2008/0046964 | A1 * | 2/2008 | Muralidharan et al. | 726/1 |
| 2009/0037872 | A1 * | 2/2009 | Schnabele et al. | 717/105 |

(Continued)

FOREIGN PATENT DOCUMENTS

EP     2551773 A1    1/2013

OTHER PUBLICATIONS

Couchet, J. et al., "A General Tracking and Auditing Architecture for the OpenACS Framework," Memorias 2A. Conferencia Internacional De E-Learning Integral 2.0 Y 6A. Conferencia Internacional De Openacs, pp. 179-187;_XP002684076, Feb. 12, 2008; 9pgs.

*Primary Examiner* — Tarek Chbouki
(74) *Attorney, Agent, or Firm* — Blakely, Sokoloff, Taylor & Zafman LLP

(57) ABSTRACT

System and methods of data auditing of transaction data of an application software are described. In one implementation, the method includes data auditing of transaction data by an independent audit module where metadata of the application software is received, and an audit table based on at least one of the audit parameters, indicating the extent of audit data of one or more processes is created in an audit database of the audit module. Further, triggers for capturing data changes from the application software are generated based on at least one audit parameters. Captured changes data is optimized to reduce the storage requirements of audit data. In another implementation, the result of the analysis is displayed in form of a report in user desired format.

11 Claims, 3 Drawing Sheets

(56) References Cited

U.S. PATENT DOCUMENTS

| | | | |
|---|---|---|---|
| 2009/0080408 A1* | 3/2009 | Natoli et al. | 370/351 |
| 2009/0199301 A1* | 8/2009 | Chandrasekaran et al. | 726/27 |
| 2011/0098973 A1* | 4/2011 | Seidman | 702/179 |
| 2012/0101990 A1* | 4/2012 | Holenstein et al. | 707/615 |
| 2012/0180071 A1* | 7/2012 | Lesandro et al. | 719/313 |
| 2012/0215578 A1* | 8/2012 | Swierz et al. | 705/7.14 |

* cited by examiner

DATA AUDIT MODULE FOR APPLICATION SOFTWARE

TECHNICAL FIELD

The present subject matter relates to systems and methods for data auditing and, particularly but not exclusively, to systems and methods for data auditing of an application software.

BACKGROUND

An application software is used for automating data transactions related to processes of operations, such as business operations, manufacturing operations, communication network operations, and government operations. Typically, processes include one or more transactions which may extract, generate, or update the operations data, that is, data related to the operations. The integrity and consistency of the operations data is very important especially with regard to credibility of records, service provisions, and maintenance of record. Data auditing is a process of tracking changes, such as what data has been changed, who has made the changes to the data, and when are the changes made to the data. Further, the data auditing process also maintains a trail of changes in chronological order so that the operations data can be restored in case of any loss of data or data corruption.

The data auditing is performed on the operations data for various reasons, such as system security, fault investigation, maintenance of history, and compliance to organizational policies or statutory requirements or regulatory requirements. Moreover, the data auditing helps in analyzing pattern of changes in the operations data.

The data auditing is considered as a functional requirement and is specific to an application software, and is therefore integrated with other functional requirements of the application software. For example, a telecom application of an organization has a process named 'customer relationship' which includes transactions, such as billing details, customer details, plan details, and usage pattern details. All of these transactions will have different data auditing implementations and the same is usually written at the time of development of the application software, 'customer relationship'. Subsequent to the deployment of the application software, if the organization needs to audit a new data field that is not covered in the current version of the application software, then the application software has to be modified for incorporating the new audit feature.

SUMMARY

This summary is provided to introduce concepts related to a process of data auditing of transaction data of an application software and the concepts are further described below in the detailed description. This summary is neither intended to identify essential features of the claimed subject matter nor is it intended for use in determining or limiting the scope of the claimed subject matter.

In an embodiment, a method of auditing of transaction data of an application software by an audit module includes receiving metadata of the application software by the audit module. The method of auditing further includes creating at least one audit table in an audit database of the audit module based on at least one audit parameter. The method of auditing further generates at least one trigger for capturing data changes from the application software, based on the at least one audit parameter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
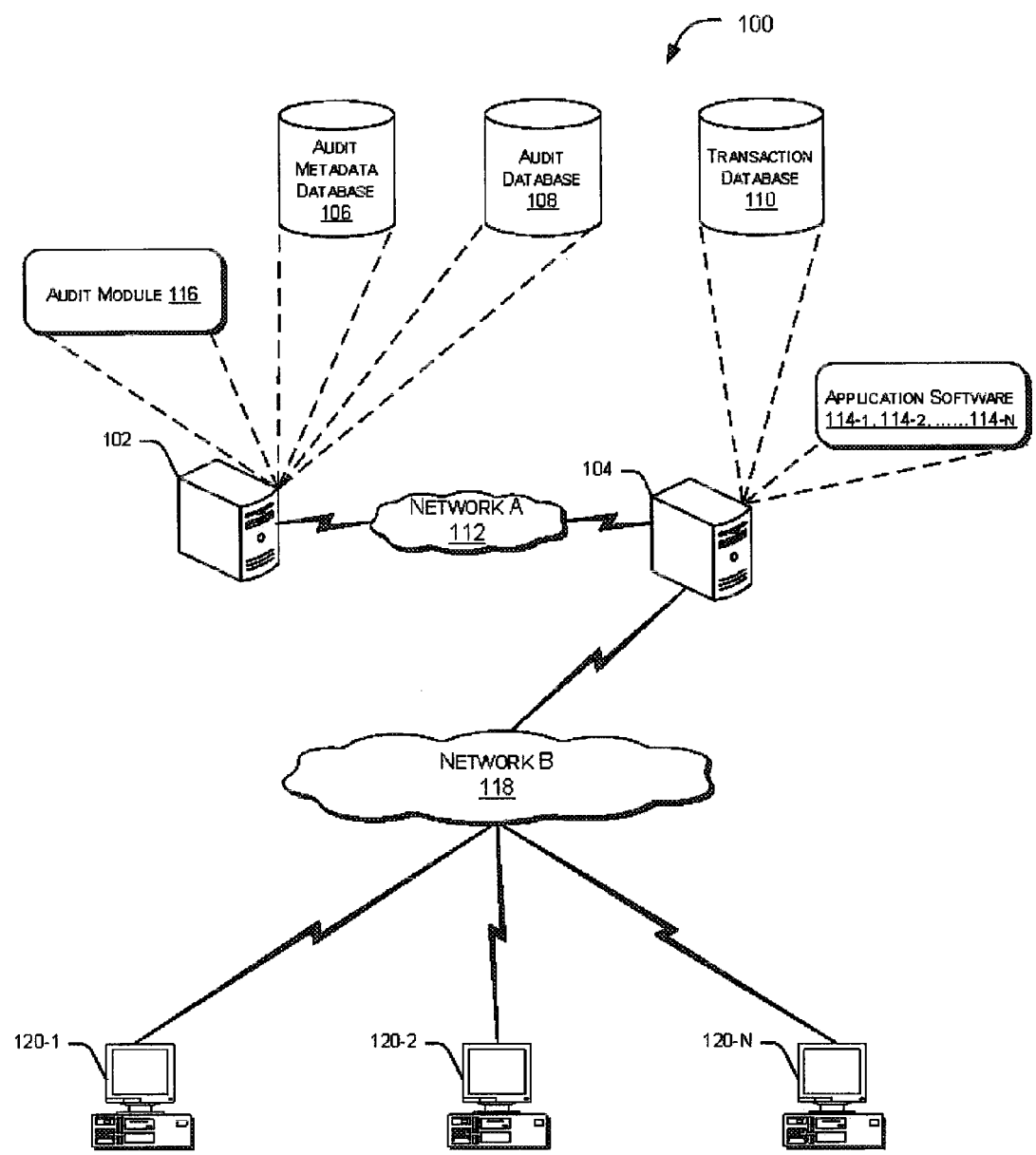
FIG. 1 illustrates a network environment implementing an audit system for independent auditing of an application data, in accordance with an embodiment of the present subject matter.

An application software deals with automation of an operation. Every operation has one or more processes, such as Customer Relation Management (CRM), employee management processes, and provisioning processes. Each process deals with multiple transactions, such as customer address update, and every transaction deals with persistent data, such as a addition of new customer data. Based on the nature of the transactions, the persistent data may be either master data or transaction data. Generally, the master data is relatively small in size and static in nature, and reasonably controlled. Majority of the data in any system is the transaction data and is highly vulnerable to the possibility of unauthorized changes, by the use of create, modify, or delete functionalities.

Data auditing is a process of tracking changes to data, such as, what has been changed, who has made the changes, and when they are made. With the increase in the rate of data generation in computerized information networks, there is a need to track the addition made to the data and the changes made thereafter. These computerized information networks are accessed by multiple authorized users. Often, government regulations require that the changes made to certain data to be tracked to protect interests of the consumers or to safeguard issues related to national security. For example, banks and other financial institutions are required to track changes to data related to accounts so as to protect the interests of customers and to prevent fraud. Tracking of changes also helps in tracking any illegal high value transactions that are made for abetting corruption or compromising national security. The data auditing is done by an end user of the system, an enterprise program user outside the boundary of the system, or any other users having access to the system or data, such as database administrator (DBA), privileged users, and support personnel. The data auditing is done concurrently with the data creation or changes thereof.

In every application software, the data auditing serves multiple objectives, such as, security assurance, fault investigation, history maintenance or record keeping, compliance to organizational policies/regulatory standards, and compliance to statutory requirements. The data audit requirements varies from one application to another and also varies with time for the application due to requirements specific to one or more reasons mentioned above. The data auditing is expected to capture and maintain an audit record of all the creation of and the changes to the data. For example, the audit record normally includes what data have been created or changed, who created the data or made the changes thereto, when the data were created or the changes were made therein, what was the old value, and what is the changed value.

Conventionally, the data auditing requirements are defined at the time of development of an application software having one or more transaction modules for processing transactions. Each process of the application software may have one or more transaction modules. Data auditing features are usually included within the transaction modules at the time of developing of the application software. Hence, data audit implementation is a specific and integral feature of the transaction modules of the application software and therefore may not be re-usable even for other similar transactions. Hence, it follows that every application software will have specific data auditing implementation. Therefore, in case of any modifications or upgrades to the transaction module of the application software, the data auditing implementation will also have to be, accordingly, modified.

The present subject matter describes systems and methods for data auditing, that is independent of an application software, having one or more transaction modules. In one embodiment, a system for data auditing includes an audit module, which is independent of the application software, and may be configured to audit transactions without implementing it as an integral part of one or more transaction modules of the application software The application software, with which the audit module is implemented, may process the transactions related to any operations, such as business operations, manufacturing operations, government operations, or telecommunication network operations. Further, the data audit module may be implemented at the application level or at the process level or at the transaction module level.

The audit module implementation is independent of application software that may be used with any application software, thus making it easy to modify the audit module or the application software independent of each other, as and when required. A user interface, reporting features, and display features of the audit module makes it easy for the users to use and configure the audit module for auditing transaction related to any application software. Further, the features of the audit module make it easier to prepare audit report independent of the transactions in a preconfigured template form. The audit module can operate on multiple operating system platforms and multiple business applications without having to be customized.

The audit module optimizes data storage requirements and provides flexibility to specify user configurable parameters of the application software whose data is audited at run-time. If there are any changes in the application software, the audit module automatically updates audit metadata or pre-saved formats related to transaction database corresponding to one or more transaction modules. The metadata may include, but is not limited to, metadata of transactions, database entity details, transactions to entity mapping, entity relationship, and transaction data transformation. Thus, the present subject matter provides the audit module that enables saving of efforts because there is no need to create a set of artifacts per transactions, saving of cost because of less effort to functionally upgrade the software applications without having to re-write the code related to audit functionality, enhanced quality due to generic implementation, and most importantly reduced cost of managing quality as fewer artifacts needs to be validated or tested.

The audit module provides a default list of configuration parameters where a user can modify a list of configuration parameters according to the requirements. The user configures a source of an application software metadata. Further, metadata of the application software and associated transaction database is extracted automatically. Only structures of the databases are retrieved and no relevance is given to the actual content of the database. A plurality of databases can also be configured for metadata capturing. The metadata, as captured, is displayed in a user interface and can be reviewed or modified by the user if required. The user can make changes in audit module including access permissions, update restrictions to tables and columns. The audit module creates audit tables scripts for storing any data changes and scripts are applied by the user. Further, the audit module can also be configured to generate database trigger Structured Query Language (SQL) scripts. The SQL or aspect based queries performing data capturing are implemented by the audit module. Further, transactions of the application software whose data changes are to be captured are configured by the user. The transaction specific report based on the configured parameters and the audit data requirements as configured by the user is generated for future references. The audit module is configured to optimize all the data changes captured since last execution on at a given times of the day. The audit data setup is validated and a validation report is generated. The validation report is reviewed, modified and confirmed by the user. The audit module captures the data changes in the application software at real time change in data. The data storage used for storing the data changes is optimized for efficient usage of database and the actual data changes and the audit report is provided to the user by the audit module.

These and other advantages of the present subject matter would be described in greater detail in conjunction with the following figures. While aspects of described systems and methods for data auditing of application software can be implemented in any number of different computing systems, environments, and/or configurations, the embodiments are described in the context of the following exemplary system (s).

FIG. 1 shows an exemplary network environment 100 for implementing a system to audit data of an application software implementing one or more transactions. The network environment 100 includes an audit system 102 communicating, through a network A 112, with a business system 104. The business system 104 communicates, through a network B 118, with client devices 120-1, 120-2 . . . , 120-N collectively referred to as client devices 120 and individually referred to as a client device 120. The client devices 120 include one or more entities, working in different operating units within or outside the organization to meet their aspired business objectives. In one implementation, the network environment 100 may include a plurality of the business systems 104 and the audit systems 102.

With reference to FIG. 1, the network environment 100 includes general purpose computing devices in form of the client devices 120. The network environment 100 also includes computing devices in form of the audit system 102 and the business system 104 servers supporting any of the following architecture including, but not limited to, Intel x86, power performance computing (PowerPC), scalable processor architecture (SPARC), Mainframe. Components of the computing devices may include, but are not limited to, a processing unit, a system memory, and a system bus that couples various system components including the system memory to the processing unit. The system bus may be any of several types of bus structures including a memory bus or memory controller, a peripheral bus, and a local bus using any of a variety of bus architectures. By way of example, and not limitation, such architectures include industry standard architecture (ISA) bus, micro channel architecture (MCA) bus, enhanced ISA (EISA) bus, video electronics standards association (VESA) local bus, and peripheral component interconnect (PCI) bus also known as Mezzanine bus. The audit system 102 and the business system 104 may be implemented across multiple platforms, operating across a local network or across the Internet. Multiple computer systems like client devices 120 can communicate with one another and with the business system 104 via the network B 118.

The computing devices like the audit system 102, the business system 104, and the client devices 120 may operate in a networked environment using communication link. It would be appreciated that the computing devices may be implemented as any of a variety of conventional computing devices, such as a server, a desktop PC, a notebook or portable computer, a workstation, a mainframe computer, a mobile computing device, an entertainment device, an internet appliance, a hand-held device, a peer device or other common network node. In one implementation, the network environment 100 can be an organization's computing network in which different operating units uses the one or more client devices 120.

The communication links depicted in FIG. 1 include the network A 112 and the network B 118, but may also include other networking environments. Such networking environments are commonplace in offices, enterprise-wide computer networks, intranets and the Internet. The network A 112 or the network B 118 may be a wireless network, a wired network or a combination thereof. The network A 112 or the network B 118 can be implemented as one of the different types of networks, such as intranet, local area network (LAN), wide area network (WAN), the Internet, and such. The network A 112 or the network B 118 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network A 112 or the network B 118 may include a variety of network devices, including routers, bridges, servers, computing devices, and storage devices, etc.

In one implementation, transactional data entries are done using the client devices 120 and are handled by the business system 104 using one of its application software 114-1, 114-2 . . . , 114-N, collectively referred to as plurality of the application software 114 and individually referred to as the application software 114. The application software 114 can be unique to an organization, and an organization can have more than one application software 114. In one example, retail organizations can have an application software for a consumer service center that routes service requests to consumer service representatives, tracks the amount of time required for each agent to handle each request, allows agents to route requests to other agents, and tracks the status of each agent and each request. In another example, an application software for a financial institution may keep track of client accounts including ownership information and account history, such as dates and amounts of deposits, withdrawals, interest earned, service fees, and balances. In yet another example, an application software for a sales organization may track sales leads and opportunities including the name and location of the prospective customer, the date of last contact, and other information relevant to the type of sales being made.

Each of the client devices 120 collects the data related to one or more transactions of the application software 114 deployed through the network environment 100. For handling and storing this data the application software 114 has a transaction database 110. The transaction database 110 may be used to store data temporarily, or for permanent or long-term storage. For example, the business system 104 may collect data from one or more data sources and transform this data into forms that are compatible with one another or compatible to be combined with one another. Once the data is transformed, the business system 104 may store the data in the transaction database 110 in a standard form, combined form or other form for later retrieval.

The transaction database 110 stores data relating to the one or more transactions of the application software 114 as entered by the user using the client devices 120 in the network B 118. In one implementation, the transaction database 110 may also store data relating to errors that occurred while processing data by the user. For example, a transaction database may maintain error tables that store data errors that were captured while processing the data. While one transaction database 110 is shown, it will be appreciated that multiple transaction databases are possible in one implementation. In one implementation, transaction database 110 can be stored at one or more locations locally, or remotely.

The transactional data related to the different transactions of the processes in the application software 114 can be collected through a combination of automated collection, and/or entry by a user on the client devices 120.

The transactional data collected can be verified for completeness and correctness by the business system 104. As per the laws and regulation of the application domain, the transactional data collected might need auditing. For example, data entered by the user could be audited for tracking any data changes. In one implementation, data auditing is done by an audit system 102 using an audit module 116.

The audit system 102 in the network environment 100 includes the audit module 116, which audits the transaction database 110 of the application software 114 of the business system 104. In one implementation, the audit module 116 features metadata administration responsible for addition and modification of an audit metadata database 106 based on the metadata collected from the application software 114. The audit module 116 also features creation of an audit database 108 based on the metadata in the audit metadata database 106, audit data capturing in the audit database 108, and audit data display responsible for displaying the audited data from the audit database 108 to users in a report, for example, in a portable document format (PDF). In one implementation, application software 114 features data transaction responsible for sending the application software 114 transactions data to a transaction database 110. In the same implementation, the audit database 108 is updated directly from the transaction database 110 and the audit metadata database 106 without involvement of the application software 114.

The audit data is generated by application software as and when application is used and is stored in the audit database 108, it may be accessed by a user with necessary privileges that can browse the audit data and/or prepare or view automatically generated or custom reports. In one implementation, ad hoc or periodic exporting of analysis results in a variety of formats may be provided, allowing for display, printing and transmission of audit data. Data in an audit database 108 may be accessed directly as well, either through standard database-access tools, or through proprietary access mechanisms. Direct access to the audit database 108 may be limited to audit managers.

The databases used in the network environment 100 are the audit metadata database 106, the audit database 108 and the transaction database 110 and may be employed on several databases, where the databases may be of different types and may include, but are not limited to, Microsoft® SQL Server (Structured Query Language), My SQL™, IBM® DB2, and Oracle® databases. The databases used in the network environment 100 can be same or different types of databases. The databases can be located physically and/or logically separate from each other or may be attached to each other. In the present subject matter, in order to further protect the integrity of the audit data, collected audit data may be encrypted and stored in the audit database 108 in an encrypted format.

The present description has been provided based on components of the exemplary network environment 100 illustrated in FIG. 1. However, the components can be present on a single computing device where the computing device can be used for assessing the processes deployed in the application software 114, and would still be within the scope of the present subject matter.

Figure 2:
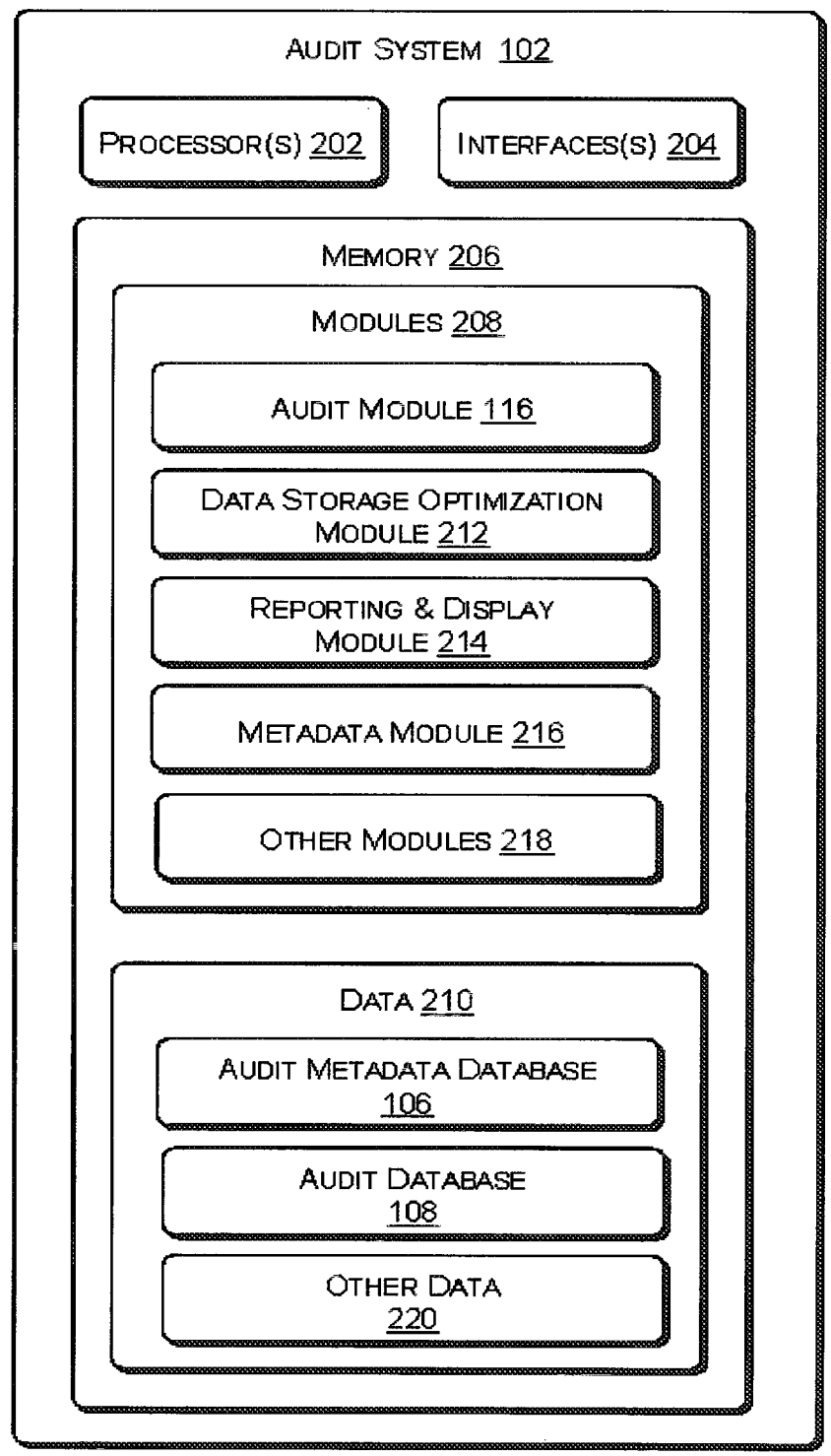
FIG. 2 illustrates an audit system, in accordance with an embodiment of the present subject matter.

FIG. 2 illustrates an audit system 102, in accordance with an implementation of the present subject matter. The audit system 102 includes a processor(s) 202, an interface(s) 204, and a memory 206 coupled to the processor(s) 202. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions stored in the memory 206.

The interface(s) 204 may include a variety of software and hardware interfaces. Further, the interface(s) 204 may enable the audit system 102 to communicate with other computing devices, such as the business system 104, web servers, internal and external data repositories. The interface(s) 204 can facilitate multiple communications within a wide variety of networks and protocol types, including wired networks, for example, LAN, cable, etc., and wireless networks, such as WLAN, cellular, or satellite. The interface(s) 204 may include one or more ports for connecting a number of computing devices to each other or to another server. A user with administrator privileges can enter data for creating an audit trail which is a sequence of steps supporting the changes in data, using the audit system 102, of fields within the selected transactions, to be audited by invoking a particular application software 114 by the interface 204.

The memory 206 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes Further, the memory 206 includes module(s) 208 and data 210. The module(s) 208 further includes an audit module 116, a data storage optimization module 212 for optimizing the data storage on the audit database 108, a reporting and display module 214 for displaying a report of the audit data to the user on a user interface, a metadata module 216 for creating audit artifacts including fetching, loading and validating the metadata setup of the application software 114 and other module(s) 218. The other module(s) 218 may include programs or coded instructions that supplement applications and functions of the audit system 102. The other module(s) 213 may also include artifacts like table scripts, trigger scripts, data optimization constructs, report artifacts, and validation artifacts.

Additionally, the memory 206 further includes data 210 that serves, amongst other things, as a repository for storing data processed, received and generated by one or more of the module(s) 208 of the audit system 102 and/or by the business system 104. The data 210 includes the audit metadata database 106, the audit database 108, and other data 220. The other data 220 includes data generated as a result of the execution of one or more modules in the other module(s) 218. In one implementation, the audit metadata database 106, the audit database 108, and the other data 220, may be stored in the memory 206 in the form of data structures. In another implementation, data received or generated by the audit system 102 and/or received from the business system 104 is stored in the data 210.

Further, the audit system 102 is capable of generating audit data from the application software 114 of the business system 104 by using the audit module 116. The application software 114 can be configured to act on specific process or part of a distributed process through one or more of the transaction database 110 within a single enterprise. The output of the audit module 116 is passed to the interface 204 which is designed to interpret the audit data output and translate it into the specified format, which is then passed to the audit database 108.

The audit module 116 identifies metadata from the transactions of the application software 114 and also from the associated databases, tables, and sub-process steps. The audit metadata from the associated process steps is routed to a corresponding storage location in the audit metadata database 106. The audit metadata database 106, in one example is a relational database having metadata records of elements, attributes or steps associated with distinct processes and metadata details of the relationships between the transactions. Thus, upon properly ascertaining audit metadata of an associated transaction, the audit metadata is stored in the audit metadata database 106. In this manner all audit metadata for one or more transactions of one or more processes of the application software 114 can be assembled, aggregated, verified and stored in the audit metadata database 106. The interface 204 interacts with the application software 114 and the transaction database 110 to generate the format and content of the data presented to the user using the interface 204. The user can also enter commands to view and query audit data using the interface 204.

For example, the audit metadata database 106 may store the parameters of each transaction of the processes, along with, data identifying the rules to be executed for each transaction, servers that need to be called for each transaction, services to be executed for each transaction, and/or the other data 220 needed for executing the transaction. While the one audit metadata database 106 is shown, it will be appreciated that a plurality of the metadata databases 106 are possible in one implementation. In one implementation, audit metadata database 106 can be stored at one or more locations locally, or remotely.

The audit database 108 in the audit system 102 above may be a relational database that stores the collected audited data after auditing of the application software 114. The audit database 108 includes audit data having a collection of audited transaction records, changes in the transaction records of the transaction database 110, also referred to as audit trail items. The user can select an option to write the audit trails to one or more than one audit databases. While the one audit database 108 is shown, it will be appreciated that a plurality of the audit databases 108 are possible in one implementation. In one implementation, the audit database 108 can be stored at one or more locations locally, or remotely.

A visual display of the corresponding data fields of the application software 114, its processes and associated transaction database 110 fields can be presented to the user using the interface 204. A user can select one or more fields in any of the application software 114 to be audited. The results of the audit trails can be viewed using the interface 204, which allows user to query the results of one or more audit trails. One or more of the computing devices can be utilized to implement the interface 204, while one or more of the computer server systems can be utilized to implement the audit system 102 and the business system 104. Thus, metadata of a transaction database is captured directly from the application software by an independent audit module.

Figure 3:
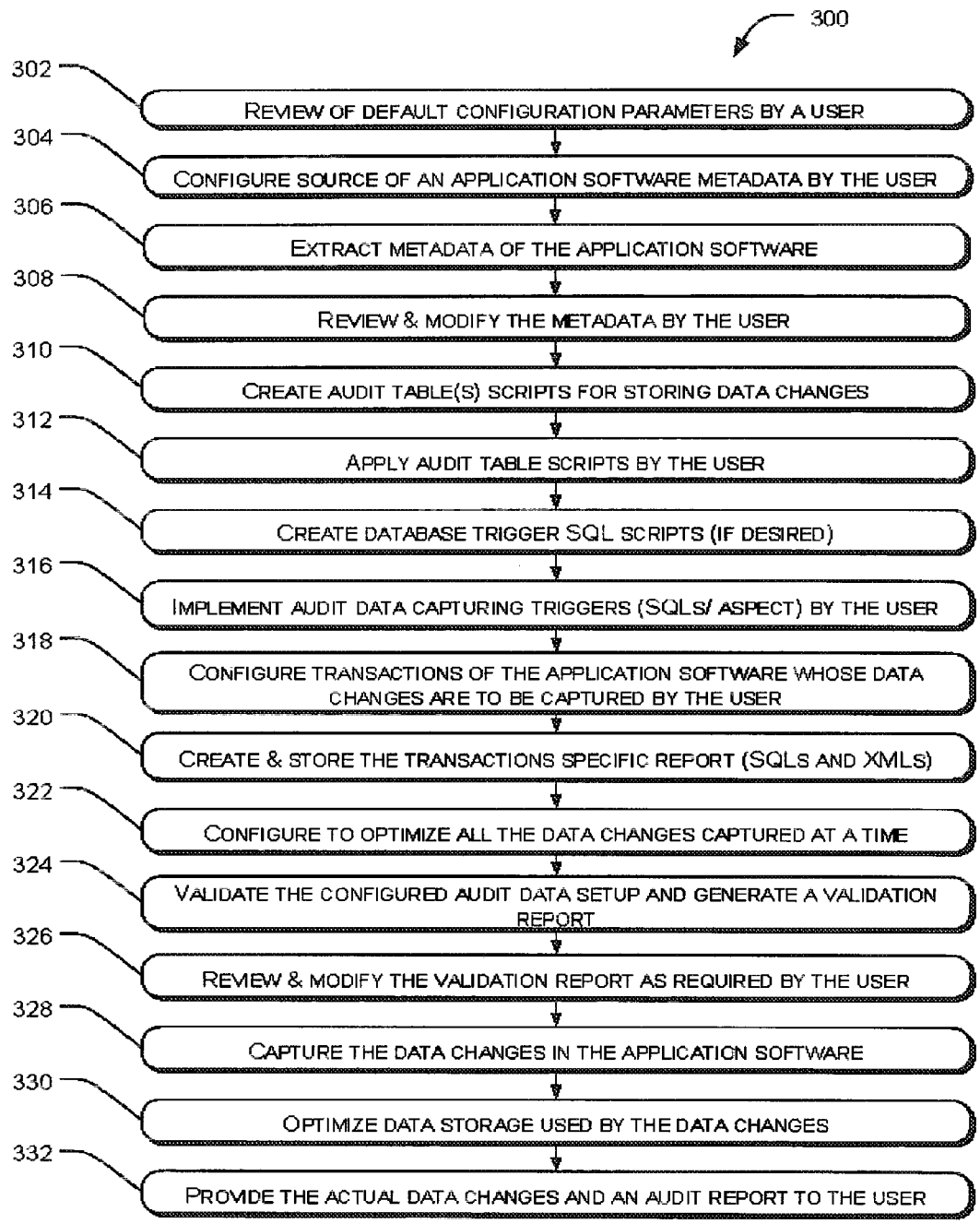
FIG. 3 illustrates a method to implement data auditing in an audit module, in accordance with an embodiment of the present subject matter.

FIG. 3 illustrates an exemplary method 300 for data auditing configuration for auditing an application software 114, according to an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed network environment where functions are performed by remote processing devices that are linked through a communication network. In a distributed network environment, computer executable instructions may be located in both local and remote computer storage media, including memory storage devices.

The order in which the method 300 is described is not intended to be construed as a limitation, and any number of the described method blocks can be combined in any order to implement the method 300, or alternative methods. Additionally, individual blocks may be deleted from the method 300 without departing from the spirit and scope of the subject matter described herein. Furthermore, the method 300 can be implemented in any suitable hardware, software, firmware, or combination thereof. The method 300 is presently provided for implementing data auditing of the application software 114.

The audit module 116 also provides a graphical user interface (GUI) based user interface. The user interface is configured to receive input from the user. Thus, the present subject matter provides a GUI-based user configurable technique for data auditing of the application software 114. In one implementation, a user does not need to write code or understand the system architecture. Instead, the present subject matter provides a simple technique for technically trained users as well as business users and to do data auditing dynamically.

The configuration of the audit module 116 is done at block 302, where review of default configuration audit parameters is done by a user. A set of requisite parameters, described in subsequent paragraph, are presented with pre-filled, pre-defined entries in a user interface to the user. The audit parameters may be suited for a particular transaction or may need some changes to suit the requirements of the particular application software 114, organization standards or the interests of the stakeholders involved. The user may change the audit parameters, if required.

The audit parameters may include, but are not limited to, source of audit data like, name of database, schema, tables; list of schemas name; pattern of audit tables; source of product metadata; type of data source like, data base management system (DBMS) type—Oracle®, MySql®, IBM® DB2, etc; business transaction input; type of entities (master/transaction); database entities join condition; database attributes transformation rule; coverage of audit like only delete, update, insert or any combination of these; report transformation style like, color, font, size, header, footer, layout, etc.; trigger name pattern; audit column details like, operation date, operation name, etc; DBMS specific constructs; level of logging, etc. The key configurations at block 302, may also include business transaction identifiers; database entities details like identifier, name, type, description, schema, trigger type; entity attributes details like identifier, name, data type, description, display order, size; business transactions to entity mapping business transaction identifier, table identifier, display order, primary table; entity relationship like attribute identifier, input identifier, input sequence, dependent attribute identifier, transformation attribute identifier; business transaction like data transformation, attribute identifier, transformation attribute identifier, transformed attribute; and business transactions constructs with field description, title structured query language (SQL), header SQLs, detail SQLs, etc.

At block 304, the source of the application software 114 that includes a transaction database 110 and transactions of the application software, is configured in the audit module 116. The metadata of the application software 114 is configured by the user to further use for data auditing purposes.

At block 306, the metadata of the application software 114 is extracted and displayed by the audit module 116. The configuration audit parameters as entered by user previously will be used and all associated metadata and structural data of the application software 114 is extracted by the audit module 116 for further approval or administration by the user. In one implementation, the block 306 is an automated step of the audit process.

At block 308, the user interface of the audit module 116 provides an option of review and/or modification of the extracted and displayed metadata of the application software 114 to the user. Pre-selected auditing rules are also reviewed, selected, added, deleted, or modified in the block 308 by the user. The actions in the event of a rule failure are also specified. A user can define simple or complex rules. For example, at the block 302, a user provides parameters like database types for auditing, at block 304, source of application software is selected, at block 306 the details about all associated metadata is extracted and shown to user. At the block 308, the user specifies that auditing of one transaction T1 of the application software has rights restriction, another transaction T2 auditing can happen only when a deletion of an entry happens. Thus, the individual table, column level access of auditing rules is selected, enabled or modified. The user specific standardized naming conventions can be specified or defined to name the audit modules and their features at this block. Further in one implementation, tools and utilities to automate the audit metadata setup as much as possible are used with database tables to get list of database tables from DBMS and identify the set of table to be inserted, updated or deleted from audit metadata tables. Database table attributes can also be reviewed to get list of database tables from audit metadata tables, attributes from DBMS tables and the set of columns to be inserted, updated or deleted from audit metadata tables are identified.

At block 310, the metadata collected is stored in the audit metadata database 106 and audit tables scripts are created in the audit database 108 using the metadata and audit parameters from the application software 114. The audit table scripts are used for storing the data changes when actual data changes occur. The metadata and other parameters as collected in the blocks 302, 304, 306, and 308 are used to create a table that stores the changes in the application software 114. In one implementation, the block 310 is an automated step of the audit process.

At block 312, the audit table scripts are applied into the audit database 108 for the application software 114 by the user.

At block 314, DBMS SQL Triggers are created based on DBMS specific constructs. The block creates artifacts which will monitor changes and do necessary procedures to record those changes. The triggers are created to record changes in the transaction database 110 and capture them for auditing. The triggers are instructions which are created at the block 314, these instructions states a particular step/function to be performed when a particular event (a particular change in the transaction database 110 of the application software (114) occurs. The SQL triggers are features of the general databases and are only required to be configured as a special instruction in response to a particular business event like a change in the transaction database 110. For example, a bank may require a trigger in case a customer makes a payment above a certain amount by his credit card. The trigger should record this entry to be sent to income tax department. The process identifies the list of entities associated with the transactions from audit metadata, based on the audit metadata set-up the type of trigger required is identified. The details of attributes associated with the entities are retrieved and based on the type of DBMS and type of trigger, triggers are created. The triggers are stored in the audit metadata database 106 for reuse. There is no limitation to the number of triggers in the application software 114 as the transaction database 110 may run into thousands of tables each involving multiple fields and conditions of triggering for audit data capturing may differ for all. In one implementation, the block 314 is optional and an automated step of the audit process.

At block 316, the audit data capturing is implemented or configured by the user. The block 316 configures that the data capturing will be implemented with SQL based triggers as configured in block 314 or Aspect based SQL Interceptors. The data capturing method type is configured and implemented based on the decision of the audit module as configured by the user in previous steps at the block(s) 302, and/or 308. The SQL based trigger is already defined and further, the aspect based query interceptor is based on configuration of the transactions for auditing. The generated queries/statements invoke the query parser for determining SQL type, affected columns and their values. The data capturing as per the SQL details for inserting records in audit tables is enabled. A query parser parses the SQL query to determine the type of query (Delete, Update, and Insert), the name of affected database entities and database entity attributes. Data capturing determines the entity type and identifier for which data is changing. Based on the type of trigger, the list of attributes being affected and their current value is recorded. A construct having affected database table, columns, and current value is executed to store the data in the audit table.

At block 318, the transactions of the application software 114 whose data changes are to be captured are configured by the user. The configuration is done to capture transactions where a set of associated data is more meaningful and of interest to a business user. The associated relationships between different transactions, tables, databases of the application software 114 as already defined or already specified can be reviewed, modified, and added by the user to the audit metadata database 106. For example, if a particular audit request needs content from table t1, t2, and t3 needs to be displayed together while auditing only table t1 as per the business domain need. The same can be defined or configured at the block 318. The block 318, based on the metadata configuration prepares the constructs required at run time and store for enhanced performance. For example, a list of active transactions configured in the audit metadata, the list of database tables/entities associated with each transaction, database table attributes configured for display associated with each database table, the primary database tables, the list of input fields configured for business transactions in audit metadata, the list of join conditions configured for database table/entities, the list of attributes configured for transformation, the list of attributes configured for display in audit report header section, and the list of attribute descriptive names.

At block 320, a transaction specific audit report is generated in form of a template based on the extracted metadata and triggers as already configured by the user. Based on the configurations done that what all is selected, what is modified to suit user specific needs, and which parameters are selected, etc., all data is collated and prepared in form of a readily available template for report using the reporting and display module 214. So that, when at run time the actual auditing happens the report can be filled in the stored template and shown to the user. The reporting is done with tools and processes to display data in user friendly formats in multiple preconfigured templates making it useful for technical users as well as business users (the report shows business entities view for business users rather than database table view only for technical users). The formats are suitable for any system supporting extensible markup language (XML). Portable document format (PDF) can also be used for sharing digitally signed data in reports.

The audit report supported formats may include, but are not limited to, XML, Hypertext Markup Language (HTML). PDF, Microsoft excel file format (XLS or XLSX), Comma-Separated Values (CSV) file format, etc. The audit report generation starts with entering user inputs for audit data report. The report Format (XML, HTML, PDF, XLS, CSV), report name, transaction input (e.g. license no. for trade license details) are provided. The audit metadata configuration is read to retrieve the SQL constructs associated with the transaction; the SQL constructs on the application software 114 to fetch the audit data details are executed. The XML object is formed and transformed into desired format after applying transformation style/template.

The reports allow users to create and dynamically revise reports using the interface. This graphical application enables users to view, sort and filter audit metadata and produce customized reports. In one implementation of the present subject matter, some scheduled reports can be planned to run automatically at regular intervals. In another implementation of the present subject matter, reports can be generated at run time as and when required by the user. In one implementation, the block 320 is an automated step of the audit process.

At block 322, the audit module 116 is configured to optimize the data changes captured since last execution on at a given time of the day. At some times, data changes occur frequently and may be duplicated by a set of users. The optimization of captured data changes frequently helps to reduce the storage requirements of the data. In one implementation, block 322 is an automated step of the audit process.

At block 324, the configured audit data setup is validated and a validation report is generated. The data pulled from various configuration steps in blocks as defined is presented for validation and confirmation for checks against failures, violations or errors. The set-up verification report is generated based on the count of active and inactive transactions configured in product audit metadata, count of business transactions configured with name not specified, count of business transaction configured with no database tables mapped to it, count of business transactions configured with no input specified, count of business transactions with suspicious join conditions [no of joins specified is less than (no of tables minus 1)], count of database tables with name not specified, count of database tables with trigger type not specified, and count of business transactions with less than 3 active SQLs, etc. In one implementation, the block 324 is an automated step of the audit process.

At block 326, the validation report as generated at the block 324 is reviewed and modified by the user. Inconsistencies in the validation report will be checked and corrected by revisiting the block 324 as desired by the user. In one implementation, the block 326 is optional.

At block 328, the actual data change in the transaction of the application software 114 is captured by the audit module 116. The data capturing is a real time process which is initiated whenever a data is changed, updated, deleted, modified, edited, inserted, etc. The actual data change capturing is done at this block when the changed data and the other requisite fields like who made the change, what change was made, old value, new value, timestamps and other related data is captured and stored at the audit database 108.

At block 330, based on the actual audited data as captured in accordance with the audit process as described earlier, the data storage optimization is done using the data storage optimization module 212 for optimizing the data storage consumed by data changes as captured at block 328. The module also notes what kinds of changes are being notified and values of non-changing attributes can be reset or configured as the need arises. The optimization of the data storage will help in using less database space for the audited data as part of the process. In one implementation, the block 330 is an automated step of the audit process.

At block 332, the actual data changes as captured and an audit report, which is a summary of the audit parameters selected by the user and the outcome of the actual auditing is provided to the user for further handling and interpretations. In one implementation, the block 332 is an automated step of the audit process.

In one implementation, in case of any changes in the application software 114 are required, the application software 114 is updated and the block 304 is revisited to incorporate the incremental changes in the audit module 116 by the user.

In one implementation at any block, if a rule/process/step fail, an exception is raised, an email notification is sent, or a custom script is launched. In this scenario, rules are used to validate that, the data does not contain errors and has not been lost. Rules are also used to create alerts based on the actual value contained in the data that is audited.

In one implementation, because of the restricted access permissions on the transaction database 110, the audit metadata database 106 and the audit database 108, the functionality of the audit system 102 and/or business system 104 may be separated into two or more steps performed by users with separate assigned roles. In order to facilitate the separate steps, the audit system 102 may be provided on multiple media, for example, on multiple storage media, each containing programs and instruction for a particular step. If a user determines that the network environment 100 needs additional security, a firewall may be installed between the data 210 and the module 208.

In one example, an audit table may be generated based on following exemplary tables (Table 1, Table 2, Table 3, Table 4) below, in the audit database that includes different columns, such as Audit Action, Audit Timestamp, Offer Status, Activation Date, Created By, Created Ts (Timestamp), Updated Ts (Timestamp), and others. The updated Ts (timestamp) depict the time of last update of any changes in the record.

TABLE 1

CMS Offer Header

| Audit Action | Audit Timestamp | Offer Id | Offer Desc | Offer Begin Dt | Offer End Dt | Offer Status | Activation Dt | Coupon Type Other | Created By | Created Ts | Updated By | Updated Ts | Re Occurance |
|---|---|---|---|---|---|---|---|---|---|---|---|---|---|
| Insert | 2011-5-16 15.4.10.0 | 2969 | Thanksgiving sale | 2011-11-1 0.1.0.0 | 2011-12-11 23.59.0.0 | 21 | 2011-05-16 | | sisir | 2011-5-16 15.4.10.0 | sisir | 2011-5-16 15.4.10.0 | 1100000 |
| Update | 2011-5-16 15.5.35.0 | 2969 | Thanksgiving and X-mas sale | | 2011-1-20 23.59.0.0 | | | | sisir | 2011-5-16 15.4.10.0 | sisir | 2011-5-16 15.5.35.0 | 1100011 |
| Update | 2011-5-16 15.6.46.0 | 2969 | Thanksgiving and X-mas sale till jan end | 2011-11-1 0.1.0.0 | 2011-1-31 23.59.0.0 | 21 | 2011-05-16 | | sisir | 2011-5-16 15.4.10.0 | sisir | 2011-5-16 15.6.46.0 | 1100011 |
| Update | 2011-5-16 15.11.28.0 | 2969 | Thanksgiving and X-mas sale till jan 2012 end | | | | | | sisir | 2011-5-16 15.4.10.0 | sisir | 2011-5-16 15.11.28.0 | 1111111 |

TABLE 2

CMS offer - Details

| Audit Action | Audit Timestamp | Offer Details Id | Coupon Vehicle name | Reserved For Desc | Coupon Upc Desc | Coupon Sku Desc | Offer Id | Is Active | Created By | Created Ts | Updated By | Updated Ts |
|---|---|---|---|---|---|---|---|---|---|---|---|---|
| Insert | 2011-5-16 15.4.10.0 | 1383 | #1921 Magazine | Creating Keepsakes | Default Upc 999999999 | SKU 10000024 | 2969 | 1 | sisir | 2011-5-16 15.4.10.0 | sisir | 2011-5-16 15.4.10.0 |
| Update | 2011-5-16 15.5.35.0 | 1383 | #1921 Magazine | none | Default Upc 999999999 | SKU 10000024 | 2969 | | sisir | 2011-5-16 15.4.10.0 | sisir | 2011-5-16 15.5.35.935000000 |
| Update | 2011-5-16 15.6.46.0 | 1383 | #1927 Loyalty Program | none | Default Upc 999999999 | SKU 10000024 | 2969 | | sisir | 2011-5-16 15.4.10.0 | sisir | 2011-5-16 15.6.46.62000000 |
| Update | 2011-5-16 15.11.28.0 | 1383 | #1927 Loyalty Program | Loyalty card | Default Upc 999999999 | SKU 10000024 | 2969 | | sisir | 2011-5-16 15.4.10.0 | sisir | 2011-5-16 15.11.28.92600000 |
| Update | 2011-5-16 15.5.35.0 | 1383 | #1921 Magazine | none | Default Upc 999999999 | SKU 10000024 | 2969 | | sisir | 2011-5-16 15.4.10.0 | sisir | 2011-5-16 15.5.35.935000000 |
| Update | 2011-5-16 15.6.46.0 | 1383 | #1927 Loyalty Program | none | Default Upc 999999999 | SKU 10000024 | 2969 | | sisir | 2011-5-16 15.4.10.0 | sisir | 2011-5-16 15.6.46.62000000 |
| Update | 2011-5-16 15.11.28.0 | 1383 | #1927 Loyalty Program | Loyalty card | Default Upc 999999999 | SKU 10000024 | 2969 | | sisir | 2011-5-16 15.4.10.0 | sisir | 2011-5-16 15.11.28.926000000 |

TABLE 3

CMS offer - Qualification

| Audit Action | Audit Timestamp | Qualification Id | Offer Id | Dtl | Item Quantity | Purchase Amount | Offer Unit | Offer Limit | Is Active | Created By | Created Ts | Updated By | Updated Ts |
|---|---|---|---|---|---|---|---|---|---|---|---|---|---|
| Insert | 2011-5-16 15.4.10.0 | 2486 | 2969 | Transaction Based | 0 | 100 | 12 | 5 | 1 | sisir | 2011-5-16 15.4.10.0 | sisir | 2011-5-16 15.4.10.0 |
| Update | 2011-5-16 15.5.35.0 | 2486 | 2969 | Transaction Based | | | | 10 | | sisir | 2011-5-16 15.4.10.0 | sisir | 2011-5-16 15.5.35.0 |
| Update | 2011-5-16 15.6.46.0 | 2486 | 2969 | Transaction Based | | 150 | | | | sisir | 2011-5-16 15.4.10.0 | sisir | 2011-5-16 15.6.46.0 |
| Update | 2011-5-16 11.28.0 | 2486 | 2969 | Transaction Based | | 180 | 15 | | | sisir | 2011-5-16 15.4.10.0 | sisir | 2011-5-16 15.11.28.0 |

TABLE 4

CMS Offer - Product Inclusion

| Audit Action | Audit Timestamp | Product Type Inclusion Id | Dtl | Offer Id | Is Active | Created By | Created Ts | Updated By | Updated Ts |
|---|---|---|---|---|---|---|---|---|---|
| Insert | 2011-5-16 15.4.10.0 | 1523 | Regular Product Type | 2969 | 1 | sisir | 2011-5-16 15.4.10.992000000 | sisir | 2011-5-16 15.4.10992000000 |
| Insert | 2011-5-16 15.4.10.0 | 1524 | Sale Product Type | 2969 | 1 | sisir | 2011-5-16 15.4.10.992000000 | sisir | 2011-5-16 15.4.10.992000000 |

In one implementation, four illustrative exemplary result audit table views as shown above are described below. The result audit table views are composed of different levels of details. At a first level of detail, the table 1 'CMS Offer—Header' is shown to have details like Audit Action, Audit Timestamp, Offer Id, Offer Desc (Description), Offer Begin Dt (Date), Offer End Dt (Date), Offer Status, Activation Dt (Date), Coupon Type Other, Created By, Created Ts (Timestamp), Updated By, Updated Ts (Timestamp), And Re Occurrence fields are shown to have a record entry insertion at 2011-5-16 15.4.10.0 and a first update at 2011-5-16 15.5.35.0, second update at 2011-5-16 15.6.46.0 and a third update at 2011-5-16 15.11.28.0. The updates are actually the audited data which is captured by change in data of the table named 'CMS Offer—Details'.

At a second level of detail, the table 2 'CMS Offer—Details' is shown to have details like Audit Action, Audit Timestamp, Offer Details Id, Coupon Vehicle Name, Reserved For Desc, Coupon Upc Desc, Coupon Sku Desc, Offer Id, Is Active, Created By, Created Ts (Timestamp), Update By, And Updated Ts (Timestamp) fields are shown to have a record entry insertion at 2011-5-16 15.4.10.0 and a first update at 2011-5-16 15.5.35.0, second update at 2011-5-16 15.6.46.0, a third update at 2011-5-16 15.11.28.0, a fourth update at 2011-5-16 15.5.35.0, fifth update at 2011-5-16 15.6.46.0 and a sixth update at 2011-5-16 15.11.28.0. The updates are actually the audited data which is captured by change in data of the table named 'CMS Offer—Details'.

At a third level of detail, the table 3 'CMS Offer—Qualification' is shown to have details like Audit Action, Audit Timestamp, Qualification Id, Offer Id, Dtl, Item Quantity, Purchase Amount, Offer Unit, Offer Limit, Is Active, Created By, Created Ts (Timestamp), Update By, And Updated Ts (Timestamp) fields are shown to have a record entry insertion at 2011-5-16 15.4.10.0 and a first update at 2011-5-16 15.5.35.0, second update at 2011-5-16 15.6.46.0, and a third update at 2011-5-16 15.11.28.0. The updates are actually the audited data which is captured by change in data of the table named 'CMS Offer—Qualification'.

At a fourth level of detail, the table 4 'CMS Offer—Product Inclusion' is shown to have details like Audit Action, Audit Timestamp, Product Type Inclusion Id, Dtl, Offer Id, Is Active, Created By, Created Ts (Timestamp), Update By, And Updated Ts (Timestamp) fields are shown to have a record entry insertion at 2011-5-16 15.4.10.0 and another record entry insertion at 2011-5-16 15.4.10.0 with different product type inclusion. The absence of updates/modify audit action shows absence of any changes in data of the table named 'CMS Offer—Product Inclusion'.

Implementations described herein provide a generic interface and an audit module that can be used to implement any type of interface for various kinds of systems, such as enterprise resource planning (ERP) systems (e.g., SAP®, Oracle® PeopleSoft, etc.), business warehouse systems, legacy systems, web services, and business-to-business services. The users may work by configuring the metadata-driven audit data capturing from the transaction databases of one or more transactions of the application software. The audit module 116 may also include the SQL or aspect based database triggers for database capturing. The report templates are prepared and stored for future references.

Although implementations for data auditing of an application software have been described in language specific to structural features and/or methods, it is to be understood that the appended claims are not necessarily limited to the specific features or methods described. Rather, the specific features and methods are disclosed as exemplary implementations of data auditing of an application software.

We claim:

1. A method for auditing transaction data of an application software by an audit module coupled to a processor, the method comprising:
   extracting, by the audit module, metadata of the application software and associated transaction database based on at least one audit parameter, wherein the extracting comprises extracting structures of the transaction database without extracting actual content of the transaction database, wherein the metadata and the associated transaction database correspond to one or more transaction modules, and wherein the audit module is independent of the application software, and wherein the audit module is updated when one or more transaction modules configured to process transactions of the application software are updated;
   routing the metadata to a corresponding storage location in an audit metadata database, wherein the audit metadata database includes metadata records of at least one of elements, attribute, or steps associated with transaction processes, and metadata details of the relationships between the transactions
   creating, by the audit module, at least one audit table script in an audit database of the audit module based on the extracted metadata and the at least one audit parameter, wherein the at least one audit table script stores data changes of transactions of the application software in at least one audit table in the audit database;
   generating, by the audit module, at least one trigger, wherein the trigger captures data changes from the application software, based on the at least one audit parameter;
   configuring, by the audit module, at least one transaction of the application software whose data changes are to be captured based on the at least one trigger, wherein the at least one transaction includes associated data and associated relationships;
   generating, by the audit module, a transaction specific audit report template based on the extracted metadata and the at least one trigger; and
   capturing, by the audit module, actual data changes from the application software based on the configured at least one transaction, wherein the captured actual data is filled in the transaction specific audit report template for providing an audit data report.

2. The method as claimed in claim 1, further comprising selecting the at least one audit parameter from at least one transaction database table by the audit module coupled to the processor, wherein the database table is associated with a transaction of the application software.

3. The method as claimed in claim 1, further comprising optimizing, by the audit module coupled to the processor, data storage based on the captured actual data changes from the application software stored in the at least one audit table of the audit database.

4. The method as claimed in claim 1, further comprising:
   validating, by the audit module coupled to the processor, the created at least one audit table script and the configured at least one transaction prior to capturing actual data changes; and
   generating, by the audit module coupled to the processor, a validation report for review and modification by a user prior to capturing actual data changes.

5. The method as claimed in claim 1, further comprising providing an option, by the audit module, to a user to take action from at least one of reviewing and modifying the extracted metadata based on pre-selected auditing rules.

6. A system comprising:
   a processor;
   a memory coupled to the processor, wherein the memory comprises:
      an audit module for auditing transaction data of an application software, wherein the audit module is implemented independent of the application software, wherein the audit module is updated when one or more transaction modules configured to process transactions of the application software are updated; and wherein the audit module is configured to:
         extract metadata of the application software and associated transaction database based on at least one audit parameter, wherein structures of the transaction database are extracted without extracting actual content of the transaction database, wherein the metadata and the associated transaction database correspond to one or more transaction module;

route the metadata to a corresponding storage location in an audit metadata database, wherein the audit metadata database includes metadata records of at least one of elements, attribute, and steps associated with transaction processes, and metadata details of the relationships between the transactions create at least one audit table script in an audit database of the audit module, based on the extracted metadata and the at least one audit parameter, wherein the at least one audit table script stores data changes of transactions of the application software in at least one audit table in the audit database;

generate at least one trigger, wherein the trigger captures data changes from the application software, based on the at least one audit parameter;

configure at least one transaction of the application software whose data changes are to be captured based on the at least one trigger, wherein the at least one transaction includes associated data and associated relationships;

generate a transaction specific audit report template based on the extracted metadata and the at least one trigger; and capture actual data changes from the application software based on the configured at least one transaction, wherein the captured actual data is filled in the transaction specific audit report template for providing an audit data report.

7. The system as claimed in claim 6, wherein the audit module is further configured to select the at least one audit parameter from at least one transaction database table associated with a transaction of the application software.

8. The system as claimed in claim 6, wherein the audit module is further configured to optimize data storage based on the captured actual data changes from the application software stored in the at least one audit table of the audit database.

9. The system as claimed in claim 6, wherein the audit module is further configured to:

validate the created at least one audit table script and the configured at least one transaction prior to capturing actual data changes; and generate a validation report for review and modification by a user prior to capturing actual data changes.

10. The system as claimed in claim 6, wherein the audit module is further configured to provide an option to a user to take action from at least one of reviewing and modifying the extracted metadata based on pre-selected auditing rules.

11. A non-transitory computer-readable medium having embodied thereon a computer program for executing a method for auditing transaction data of an application software by an audit module to perform audit functions comprising:

extracting, by the audit module, metadata of the application software and associated transaction database based on at least on audit parameter, wherein the extracting comprises extracting structures of the transaction database without extracting actual content of the transaction database, wherein the metadata and the associated transaction database correspond to one or more transaction module, and wherein the audit module is independent of the application software, and wherein the audit module is updated when one or more transaction modules configured to process transactions of the application software, are updated;

routing the metadata to a corresponding storage location in an audit metadata database, wherein the audit metadata database includes metadata records of at least one of elements, attribute, or steps associated with transaction processes, and metadata details of the relationships between the transactions;

creating, by the audit module, at least one audit table script in an audit database of the audit module based on the extracted metadata and the at least one audit parameter, wherein the at least one audit table script stores data changes of transactions of the application software in at least one audit table in the audit database;

generating, by the audit module, at least one trigger, wherein the trigger captures data changes from the application software, based on the at least one audit parameter;

configuring at least one transaction of the application software whose data changes are to be captured based on the at least one trigger, wherein the at least one transaction includes associated data and associated relationships;

generating a transaction specific audit report template based on the extracted metadata and the at least one trigger; and capturing actual data changes from the application software based on the configured at least one transaction, wherein the captured actual data is filled in the transaction specific audit report template for providing an audit data report.

* * * * *